US012256290B2

(12) United States Patent
Mallya et al.

(10) Patent No.: US 12,256,290 B2
(45) Date of Patent: Mar. 18, 2025

(54) SYSTEMS AND METHODS FOR VALIDATION OF WIRELESS NETWORK INFRASTRUCTURE USING BLOCKCHAIN TECHNIQUES

(71) Applicant: Verizon Patent and Licensing Inc., Basking Ridge, NJ (US)

(72) Inventors: Sumanth S. Mallya, Flower Mound, TX (US); Dante J. Pacella, Charles Town, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 538 days.

(21) Appl. No.: 17/681,929

(22) Filed: Feb. 28, 2022

(65) Prior Publication Data
US 2023/0276197 A1  Aug. 31, 2023

(51) Int. Cl.
*H04W 4/029* (2018.01)
*G06F 21/60* (2013.01)
*H04W 48/10* (2009.01)

(52) U.S. Cl.
CPC .......... *H04W 4/029* (2018.02); *G06F 21/602* (2013.01); *H04W 48/10* (2013.01)

(58) Field of Classification Search
CPC .................................................... H04W 4/029
USPC ..................................................... 455/456.1
See application file for complete search history.

(56) References Cited

U.S. PATENT DOCUMENTS

| 11,615,381 B2* | 3/2023 | Harris ..................... G06Q 50/40 |
| | | 455/456.1 |
| 2019/0182758 A1* | 6/2019 | Graffagnino .......... H04W 48/10 |
| 2019/0385269 A1* | 12/2019 | Zachary .................... H04N 7/18 |
| 2020/0084027 A1* | 3/2020 | Duchon ................ G06F 21/602 |
| 2021/0110049 A1* | 4/2021 | Kumar .................. H04L 9/0825 |

OTHER PUBLICATIONS

"Blockchain for CORS Networks," presented at Institute of Navigation GNSS conference 2021.

* cited by examiner

*Primary Examiner* — Qutbuddin Ghulamali

(57) ABSTRACT

A system described herein may identify a particular value that was wirelessly received by a User Equipment ("UE") at a first time. The particular value may have been recorded to a blockchain, along with a second time, at which the particular value was outputted by a base station of a wireless network. The particular value may include a randomly generated number. The system may determine a location of the base station from which the particular value was outputted. The location of the UE may be determined based on a delay time associated with the particular value, which may be determined based on a difference between the first and second times. The location of the UE may further be determined (e.g., using triangulation techniques) based on values outputted by other base stations, for which the blockchain includes records indicating times at which such values were outputted by the other base stations.

20 Claims, 10 Drawing Sheets

SYSTEMS AND METHODS FOR VALIDATION OF WIRELESS NETWORK INFRASTRUCTURE USING BLOCKCHAIN TECHNIQUES

BACKGROUND

Wireless user equipment ("UE"), such as mobile telephones or other wireless communication devices, may communicate with wireless network infrastructure, such as base stations of a radio access network ("RAN") of a wireless network. A location of the UE may be determined using triangulation techniques, in which signals from multiple base stations are used in conjunction with times at which such signals were sent by the base stations and received by the UE in order to determine the location of the UE.

DETAILED DESCRIPTION OF EXAMPLE EMBODIMENTS

The following detailed description refers to the accompanying drawings. The same reference numbers in different drawings may identify the same or similar elements.

Embodiments described herein provide for the use of secure ledger techniques, such as blockchain technology, to securely determine location information of UEs that are able to communicate with wireless network infrastructure of a RAN, such as one or more base stations of the RAN. Further, embodiments described herein may provide for the secure monitoring of health metrics associated with a RAN, which may be used by a UE to determine whether to connect to particular base station. Such health metrics may include and/or may based on load, queue status, capacity, and/or other metrics associated with one or more base stations of the RAN.

The use of blockchain techniques described herein may be "secure," in that information received from base stations that do not have access to record information to a blockchain (e.g., which are not associated with a private key, wallet, account, and/or other suitable authentication mechanisms) may not be used in the determination of location, health metrics, or other information, in accordance with some embodiments. In other words, health metrics or other information associated with base stations of the RAN, recorded to the blockchain, may be verified as being provided by an authenticated source, and may therefore be reliably used by UEs or other devices or systems to, for example, determine UE location using triangulation techniques, determine whether to connect to a particular base station, or for other suitable uses. Characteristics of the blockchain, such as the immutability, auditability, client-agnostic accessibility, and decentralized trust provided by the blockchain, may be leveraged to provide for the secure monitoring of information broadcasted and/or otherwise provided by base stations, thereby providing for the secure location determination of UEs, base station health monitoring, etc. discussed herein.

Figure 1:
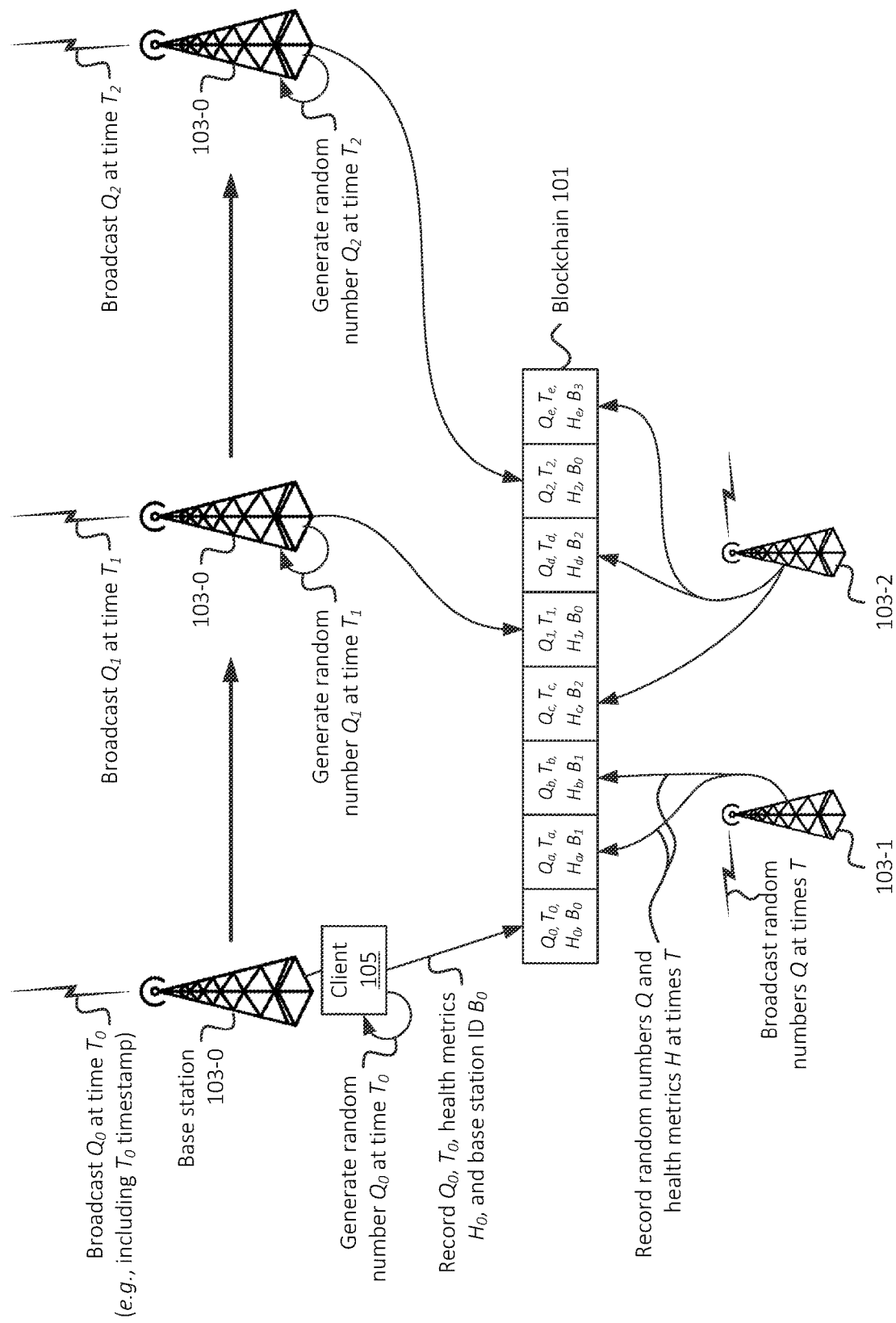
FIG. 1 illustrates an example of base stations wirelessly outputting values and the recording of such values to a blockchain, in accordance with some embodiments.

As shown in FIG. 1, blockchain 101 may maintain (e.g., as an immutable ledger) information received from one or more base stations 103, such as base stations 103-0, 103-1, and 103-2. Blockchain 101 may, in some embodiments, be implemented by a decentralized set of nodes, validators, or other elements that communicate with each other to maintain a distributed, immutable ledger (e.g., set of blocks, records, etc.). In some embodiments, blockchain 101 may verify or maintain the ledger using one or more suitable consensus mechanisms, such as proof of stake, proof of work, and/or other suitable probabilistic or deterministic protocols.

In some embodiments, each base station 103 may be associated with a respective client 105. Client 105 may be or may include a device or system that has access to blockchain 101, such as a "wallet" or other type of entity associated with blockchain 101. For example, client 105 may be or include an application that has access to blockchain 101 through an account (e.g., an address) associated with an entity associated with client 105. In some embodiments, client 105 may include or have access to a set of private keys or other security mechanism, generated in coordination with blockchain 101, that may be used to sign interactions with blockchain 101, where such signing indicates authorization by an entity associated with client 105 (e.g., a "user," a respective base station 103, etc.) to perform such interactions. As discussed below, such interactions may include recording information to blockchain 101, as discussed below. For the sake of brevity, certain actions (e.g., recording information to blockchain 101) are described as being performed by respective base stations 103. In some embodiments, some or all of such actions may be performed by, or in conjunction with, client 105.

Base stations 103 (and/or respective clients 105 associated with such base stations 103) may generate values, such as random numbers Q at different times T, where such times T may be associated with a periodic interval (e.g., every second, every minute, etc.) or some other ongoing basis. In some embodiments, random numbers Q may be quantum random numbers, or may be based on quantum random number generation or other suitable technique for randomly generating numbers. As shown, base station 103-0 may generate a first random number $Q_0$ at a first time $T_0$, a second random number $Q_1$ at a second time $T_1$, and a third random number $Q_2$ at a third time $T_2$. Times T (e.g., times $T_0$ through $T_2$) may correspond to times at which the random numbers Q are outputted by base stations 103. For example, base station 103-0 may output (e.g., broadcast) one or more signals, such as via a Master Information Block ("MIB"), a System Information Block ("SIB"), or some other type of broadcast message at times $T_0$, $T_1$, and $T_2$. Such signals may include a respective random number Q (e.g., random number $Q_0$ at time $T_0$, random number $Q_1$ at time $T_1$, and so on). In some embodiments, the random number Q may be encoded with an indication of the time T, the time T may be concatenated to the random number Q, and/or the time T may otherwise be able to be derived from the random number Q.

In this manner, blockchain 101 may securely maintain information indicating random numbers Q outputted (e.g., broadcasted) by base stations 103, as well as times T at which such random numbers Q were outputted by base stations 103. For example, as similarly discussed above with respect to base station 103-0, base stations 103-1 and 103-2 may also output random numbers Q at respective times T, and may record information to blockchain 101 indicating the outputting of such random numbers Q at respective times T.

In some embodiments, each base station 103 may also record a respective base station identifier B to blockchain 101, such that particular records (e.g., random numbers Q at times T) may be identified with respect to a particular base station 103. As discussed below, one or more UEs or other devices or systems may use the broadcasted information in conjunction with the information recorded to blockchain 101 in order to determine or verify the location of such UEs (e.g., where such location may be determined using triangulation techniques or other suitable techniques).

In some embodiments, base stations 103 may additionally, or alternatively, record health metrics H to blockchain 101. For example, health metrics H associated with a particular base station 103 at a particular time T may include a status or keep-alive message indicating that base station 103 is "healthy" or "available" at time T. Additionally, or alternatively, health metrics H may include load and/or capacity metrics (e.g., quantity of connected UEs, available radio frequency ("RF") resource capacity, queue status or load, or other suitable health, load, performance, etc. metrics). In some embodiments, as shown in FIG. 1, base stations 103 may record health metrics H to blockchain 101 at times T that correspond to times at which random numbers Q were outputted by base stations 103. In some embodiments, health metrics H and random numbers Q may be recorded to blockchain 101 at different and/or independent times. In this manner, blockchain 101 may securely and immutably maintain a historical record of health metrics H associated with base stations 103, which may be used by UEs or other devices or systems in order to determine whether to connect to respective base stations 103 (e.g., whether base stations 103 are "healthy," available, experiencing a lower measure of load than a threshold measure of load, etc.).

Figure 2:
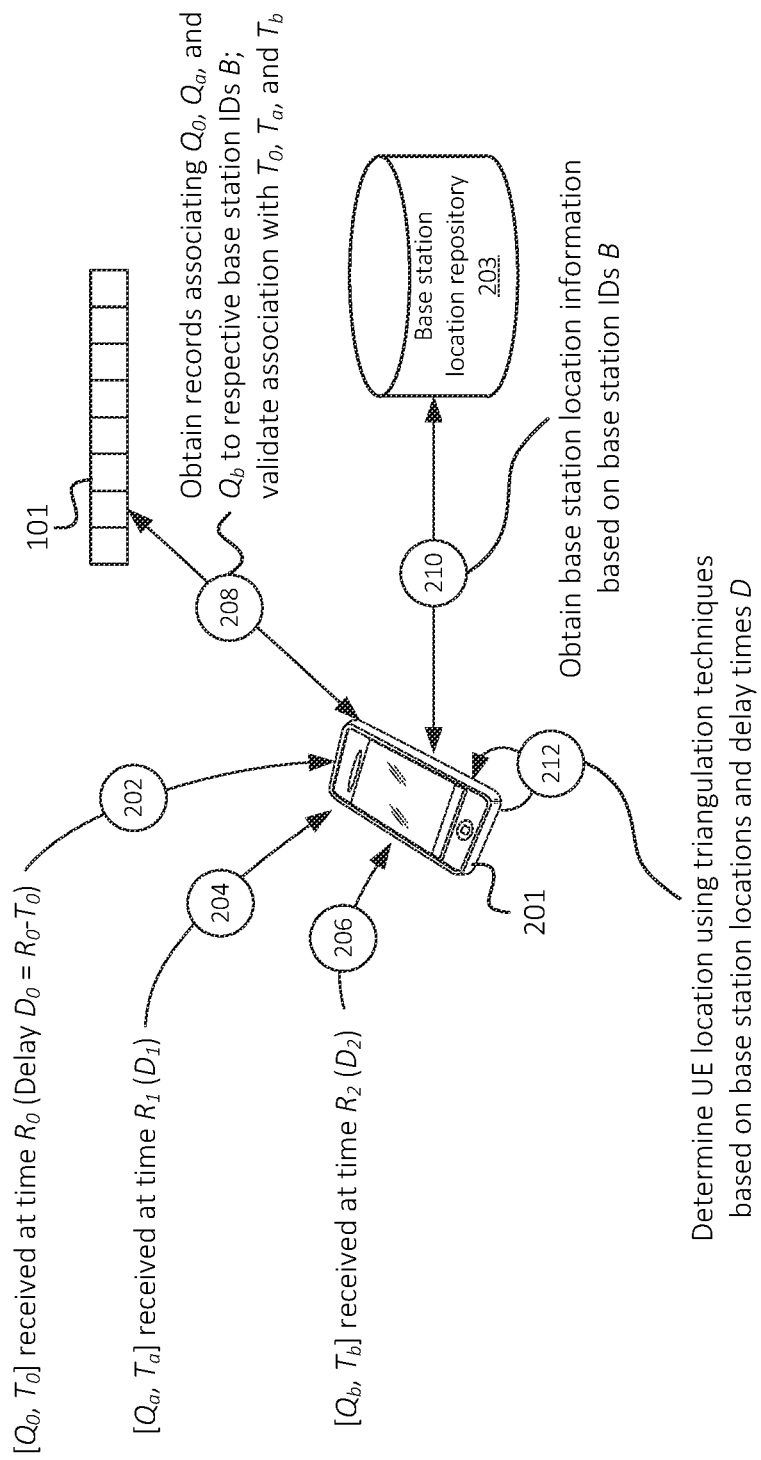
FIG. 2 illustrates an example of the determination of a location of a UE based on receiving values from one or more base stations and obtaining records associated with the received values from a blockchain, in accordance with some embodiments.

As shown in FIG. 2, for example, a particular UE 201 may receive (at 202) wireless signals outputted by (e.g., broadcasted by) a particular base station 103. As discussed above, such signals may include a particular random number (e.g., random number $Q_0$) and an indication of a time (e.g., time $T_0$) at which the signals were outputted by base station 103. UE 201 may receive such signals at a later time Ro. For example, the signals may have a travel time or delay Do from base station 103 to UE 201, such that delay D may be determined based on time T included in the signals, as well as time R at which UE 201 received such signals, such as according to Formula 1 below:

$$D=R-T \quad \text{(Formula 1)}$$

Similarly, UE 201 may receive (at 204 and 206) random numbers $Q_a$ and $Q_b$, outputted at times $T_a$ and $T_b$ respectively, at times $R_a$ and $R_b$. As such, the signals received (at 204) may be associated with delay $D_1$ and the signals received (at 206) may be associated with delay $D_2$.

In some embodiments, the signals outputted by base stations 103 (e.g., as received at 202, 204, and 206) may include a base station identifier B. In some embodiments, the wireless signals may omit the base station identifier B, and/or may include a different base station identifier. In this manner, the signals outputted (e.g., broadcasted) by base stations 103 may not include same identifiers B recorded in blockchain 101, thus enhancing the security of techniques described herein. For example, a malicious device or system attempting to "listen" to or recreate such signals may not have access to identifiers B and may therefore not be able to "spoof" an authenticated base station 103. In the example of FIG. 2, assume that the signals do not include the base station identifiers B.

In some embodiments, the wireless signals may omit the time T at which such signals were sent by base stations 103. In some such embodiments, the time T may be stored in corresponding records of blockchain 101. In this manner, base station 103 may, in some embodiments, output random numbers Q that are independent of, and/or do not include, time T.

UE 201 may obtain (at 208) records of blockchain 101 based on the received random numbers Q (e.g., $Q_0$, $Q_a$, and $Q_b$). UE 201 may, for example, implement or be communicatively coupled to a block explorer or other device, system, application, application programming interface ("API"), etc. that is able to access records recorded to blockchain 101. As discussed above, such records recorded to blockchain 101 may associate particular random numbers Q to other information, such as times T at which a particular base station 103 outputted respective random numbers Q, and/or a base station identifier B associated with such base station 103. As noted above, base station identifiers B may be different from a base station identifier included in broadcast messages outputted by base stations 103 (e.g., which include random numbers Q), and may not be included in such messages. As further noted above, UE 201 may obtain time T from blockchain 101, such as embodiments in which time T is not included in the signals outputted by base stations 103 (e.g., which include the random numbers Q).

In some embodiments, base station location repository 203 may maintain information associating base station identifiers B to respective locations of base stations 103. For example, in some embodiments, base station location repository 203 may be implemented by, may be communicatively coupled to, and/or may otherwise be associated with a Network Repository Function ("NRF") or other device or system associated with a wireless network that includes base stations 103, which maintains location information associated with base stations 103. Such location information may include latitude and longitude coordinates, Global Positioning System ("GPS") coordinates, and/or other indicators of respective geographical locations of base stations 103.

UE 201 may obtain (at 210) location information associated with the base stations 103 from which UE 201 received (at 202, 204, and 206) random numbers Q. As noted above, such obtaining (at 210) may be based on a base station identifier B of each such base station 103, which may be obtained (at 208) from blockchain 101. UE 201 may further determine (at 212) a location of UE 201 using triangulation techniques or other suitable techniques, based on the location(s) of the base station(s) 103 from which the random numbers Q were received, delay times D, and locations associated with base station(s) 103 (e.g., as obtained (at 210) from base station location repository 203).

Obtaining (at 208) the records of blockchain 101 may serve to validate the integrity of the signals received (at 202, 204, and 206). For example, the presence of random numbers Q in blockchain 101 may indicate that an entity (such as base stations 103 and/or clients 105 associated with base stations 103) that provided the random numbers Q is also authorized to record information to blockchain 101. As such, even if an entity were to reverse engineer or otherwise "spoof" signals including random numbers Q, the absence of such random numbers Q in blockchain 101 may indicate that such signals are not valid and should therefore be ignored.

Figure 3:
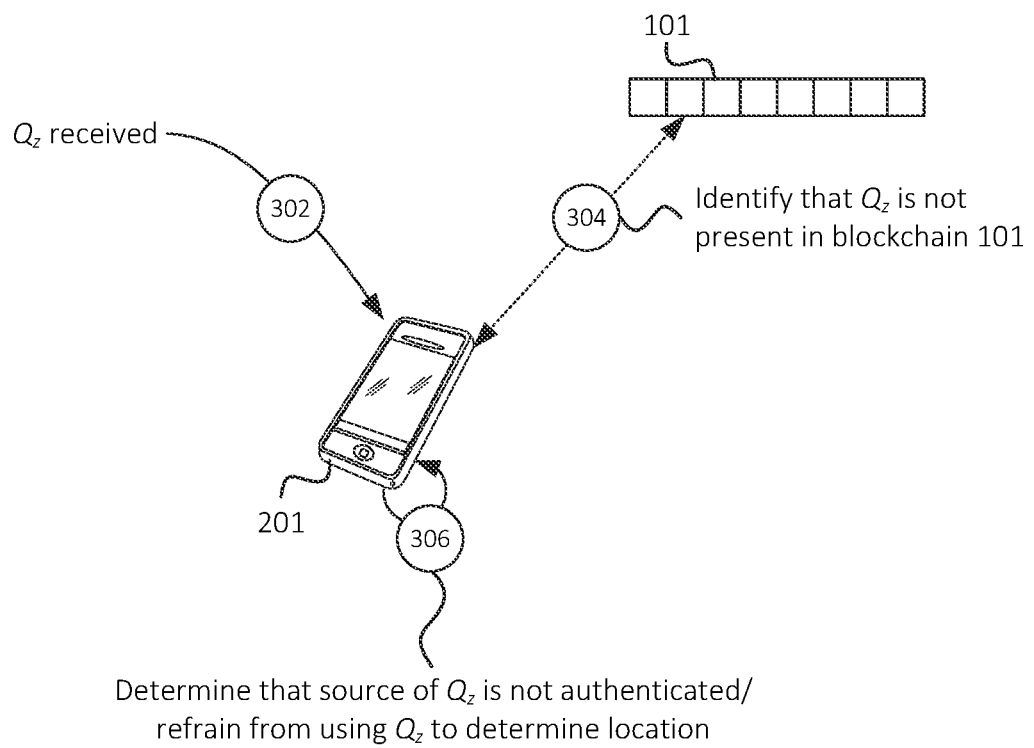
FIG. 3 illustrates an example of discarding a value wirelessly received from a base station, which was not identified in a blockchain, in accordance with some embodiments.

For example, as shown in FIG. 3, UE 201 may receive (at 302) a wireless signal that includes the random number $Q_z$. UE 201 may identify (at 304) that the random number $Q_z$ is not present in blockchain 101. For example, the random number $Q_z$ may have been outputted by an unauthorized or malicious device or system. Additionally, or alternatively, the received random number $Q_z$ may otherwise be inapplicable to UE 201 or base stations 103. For example, in some situations, the random number $Q_z$ may be used for some unrelated or other technique.

As such, UE 201 may determine (at 306) that the source of random number $Q_z$ is not authenticated and/or is unauthorized to access blockchain 101, and that random number $Q_z$ therefore should not be used by UE 201. UE 201 may, for example, refrain from using the random number $Q_z$ in a location determination technique described above.

Figure 4:
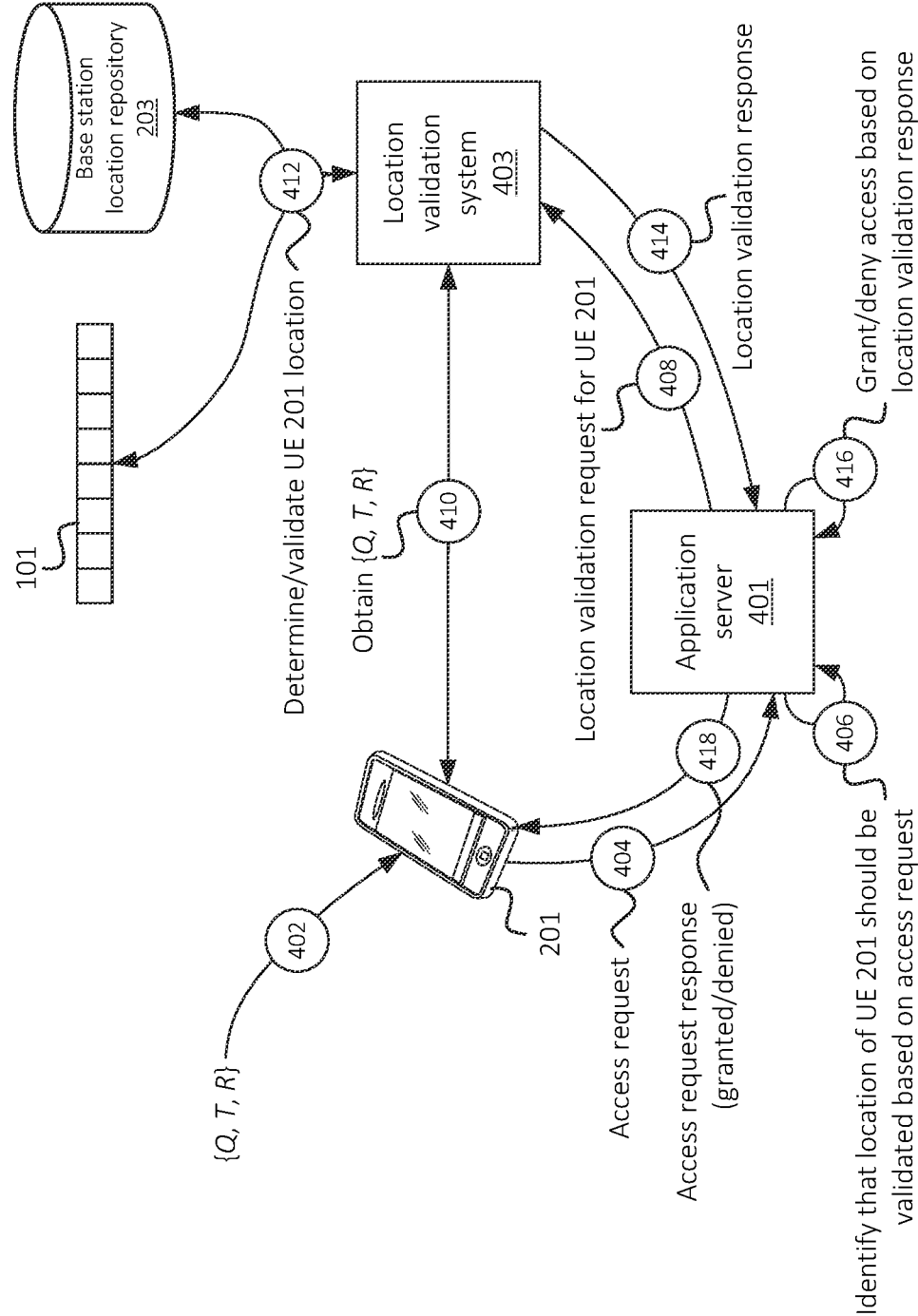
FIG. 4 illustrates an example of a location validation system validating and/or determining a location of a UE, in accordance with some embodiments.

In some embodiments, one or more other devices or systems may communicate with UE 201, blockchain 101, and/or base station location repository 203 to determine or validate the location of UE 201. As shown in FIG. 4, for example, UE 201 may receive (at 402) a set of random numbers Q along with corresponding times T and R (denoted in the figure as {Q, T, R}. As noted above, times T may be times at which the signals were sent by one or more base stations 103, and times R may be times at which the signals were received by UE 201.

At some point, UE 201 may output (at 404) an access request to application server 401, which may be a device or system that communicates with UE 201 via one or more APIs, networks (e.g., the Internet), and/or some other communication pathway. Application server 401 may be, for example, a content streaming server, a gaming server, a web server, a payment processing system, or the like. The access request may be a login request, a request for content, a request for service, a request to provide payment information, or some other type of access request. Application server 401 may identify (at 406) that a location of UE 201 should be validated based on the access request. For example, the location may be validated based on a two-factor authentication technique, an enhanced authentication technique, or some other technique or protocol in which the location of UE 201 should be validated based on the access request.

Application server 401 my accordingly output (at 408) a location validation request to location validation system 403. Application server 401 and location validation system 403 may communicate via an API or some other suitable communication pathway. Location validation system 403 may obtain (at 410) some or all of the set of information {Q, T, R} received or maintained by UE 201. For example, location validation system 403 may communicate with UE 201 via an API or other suitable communication pathway to request (e.g., "pull") such information. Additionally, or alternatively, UE 201 may "push" such information to location validation system 403 on a periodic basis, an event-driven basis, and/or on some other basis.

Location validation system 403 may further communicate (at 412) with blockchain 101 and/or base station location repository 203 in a manner similarly discussed above. For example, location validation system 403 may obtain records stored in blockchain 101 in order to validate the set of information {Q, T, R} obtained from UE 201, and/or to obtain location information from respective base stations 103 from which such information was received by UE 201. Location validation system 403 may further determine the location of UE 201 based on the obtained information using triangulation techniques or other suitable techniques, as similarly discussed above.

Location validation system 403 may provide (at 414) a location validation response, which may indicate the geographical location of UE 201, as determined by location validation system 403. In some embodiments, the location validation response may indicate that some or all of the information {Q, T, R} was invalid, such as in instances where one or more random numbers Q of the set of information {Q, T, R} were not present in blockchain 101, and/or are otherwise invalid or unverifiable.

Application server 401 may grant or deny (at 416) access to UE 201 based on the location validation response. For example, in some embodiments, application server 401 may determine whether the location of UE 201 is at an expected or authorized location (e.g., a location in which UE 201 is authorized to access requested services, which may be based on authentication information maintained by application server 401). In situations where the UE 201 is at the expected or authorized location, application server 401 may grant (at 418) access to UE 201, which may include providing requested information or services. If, on the other hand, UE 201 is not at the expected or authorized location (or if the set of information {Q, T, R} contains invalid information), application server 401 may deny (at 418) the requested access.

In some embodiments, as noted above, base stations 103 may record health metrics to blockchain 101, which may be used by UEs 201 to determine whether to connect to respective base stations 103. In some embodiments, the health metrics recorded to blockchain 101 may be used for other purposes, such as for monitoring system performance, training artificial intelligence/machine learning ("AI/ML") models, adjusting network parameters, assisting with the deployment or planning of physical wireless network infrastructure, or other uses.

Figure 5:
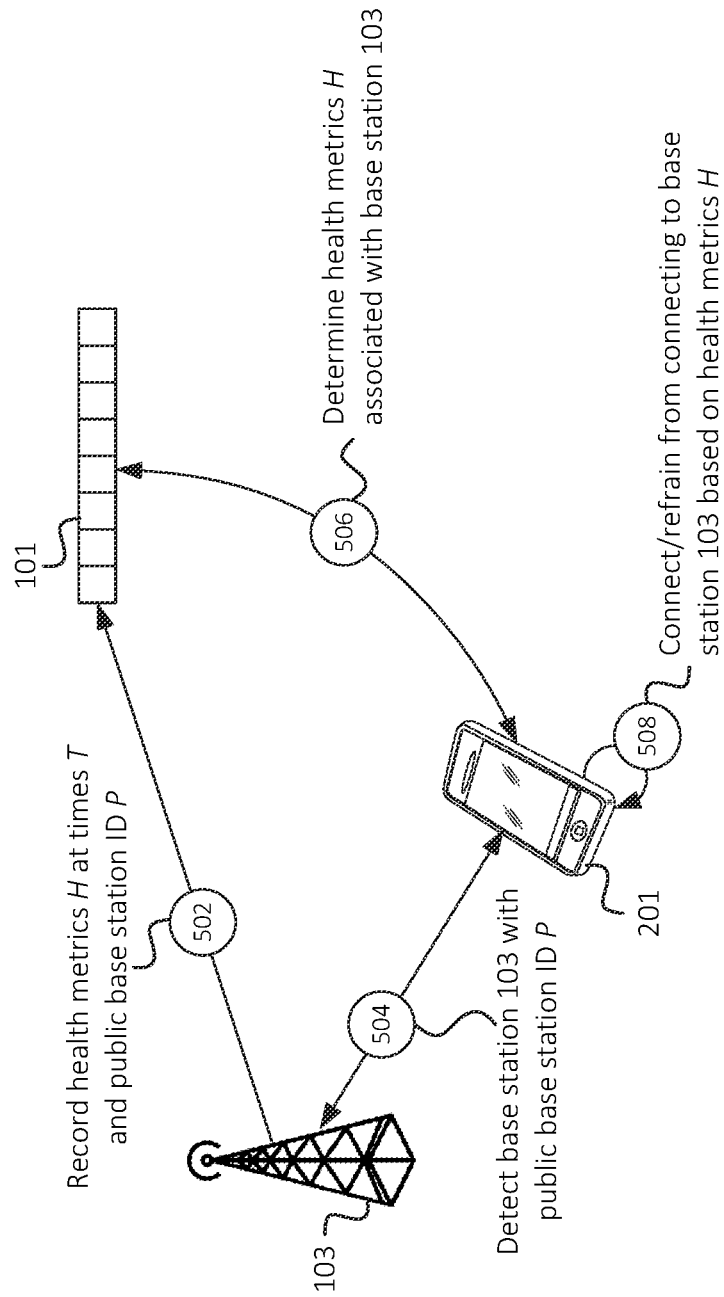
FIGS. 5 and 6 illustrate examples of securely determining health metrics associated with a base station using blockchain techniques, in accordance with some embodiments.

As shown in FIG. 5, for example, base station 103 may record, on an ongoing basis, health metrics H at respective times T to blockchain 101. In some embodiments, the recorded information may further include a public base station identifier P, where such identifier may be "public" in that the identifier may be "visible" to UEs 201 and/or other devices that are able to receive or detect wireless signals from base station 103.

For example, UE 201 may detect (at 504) the presence of base station 103, which may include detecting one or more broadcast messages such as a SIB, a MIB, and/or some other broadcast message (e.g., where such message includes the public base station identifier P of base station 103). In some embodiments, UE 201 may detect one or more random numbers Q output by base station 103 (e.g., as similarly discussed above), which may be output with a public base station identifier P of base station 103.

UE 201 may determine (at 506) health metrics H associated with base station 103 by obtaining such information from blockchain 101. For example, as discussed above, records of blockchain 101 may include such health metrics H along with corresponding time information T. In this manner, UE 201 may identify a historical record of health metrics H, based on which UE 201 may identify whether to connect or refrain from connecting to base station 103. For example, if health metrics H have not been received from base station 103 and recorded to blockchain 101 for at least a threshold duration of time (e.g., within the last hour, within the last day, etc.), UE 201 may refrain from connecting to base station 103, as base station 103 may have been compromised and/or is otherwise not recording (at 502) health metrics to blockchain 101. As another example, if the health metrics H indicate that base station 103 is overloaded, malfunctioning, etc., UE 201 may refrain (at 508) from connecting to base station 103. If, on the other hand, health metrics H indicate that base station 103 is operating nominally or within acceptable parameters, UE 201 may connect (at 508) to base station 103, may request to connect to base station 103, and/or may otherwise determine that base station 103 is an eligible candidate for connection (e.g., where some other suitable process may be used to ultimately determine whether to connect to base station 103).

Figure 6:
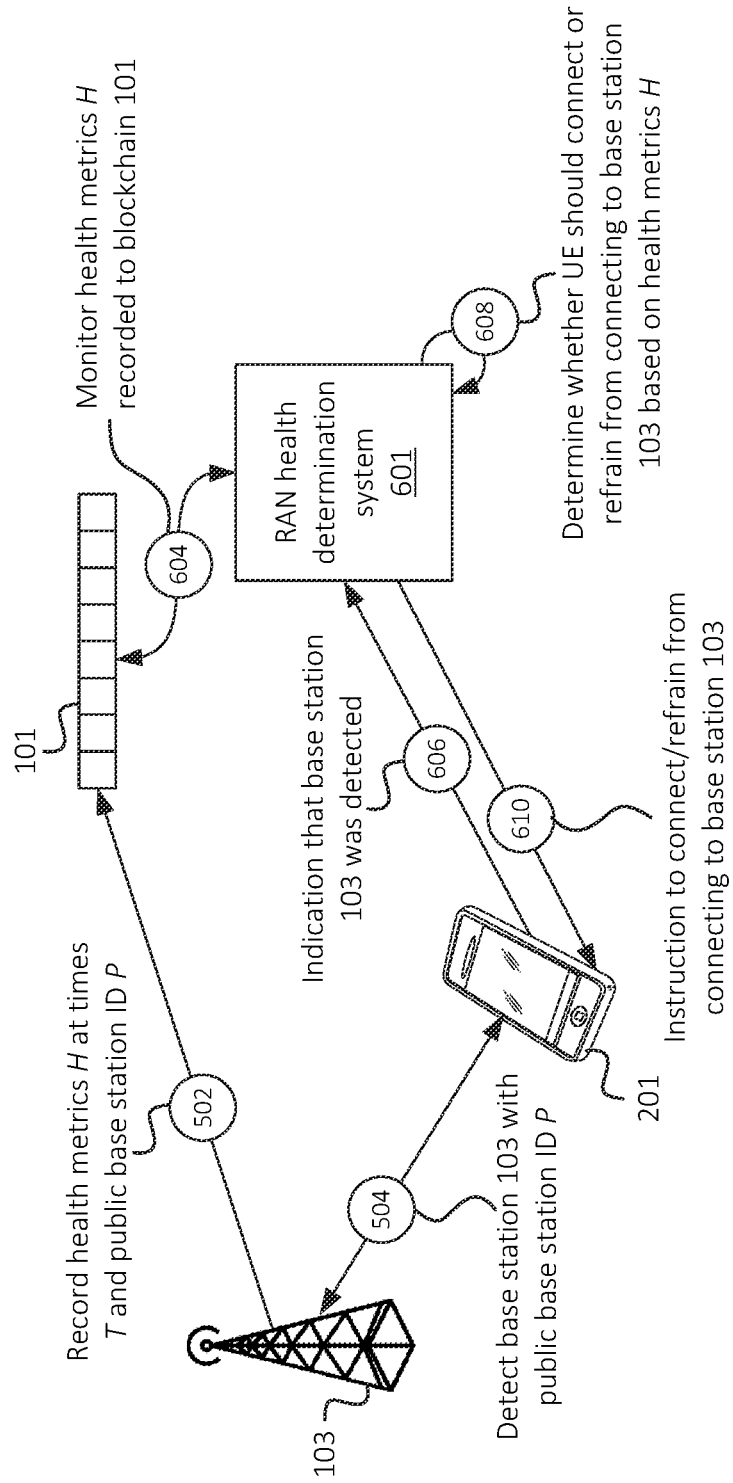

In some embodiments, as shown in FIG. 6, UE 201 may communicate with RAN health determination system 601 or some other device or system in order to determine whether to connect to base station 103. For example, RAN health determination system 601 may monitor (at 604) health metrics H recorded to blockchain 101, which may include health metrics H recorded (at 502) by base station 103 over time.

UE 201 may detect (at 504) signals from base station 103, including public base station identifier P, and may output (at 606) an indication to RAN health determination system 601 that base station 103 (e.g., with public base station identifier P) was detected. RAN health determination system 601 may determine (at 608) whether UE 201 should connect to base station 103 or refrain from connecting to base station 103 based on the received health metrics H.

For example, as similarly described above, RAN health determination system 601 may determine whether the health metrics H associated with base station 103 meet one or more criteria and/or thresholds, and may determine (at 608) that UE 201 should not connect to base station 103 if such criteria and/or thresholds are not met. On the other hand, RAN health determination system 601 may determine that UE 201 should connect to base station 103 (or that base station 103 is a candidate for connection) if the health metrics H meet the criteria and/or thresholds. RAN health determination system 601 may accordingly output (at 610) an instruction or indication to UE 201, that UE 201 should refrain from connecting to base station 103, that UE 201 should connect to base station 103, or the base station 103 is a candidate for connection.

Figure 7:
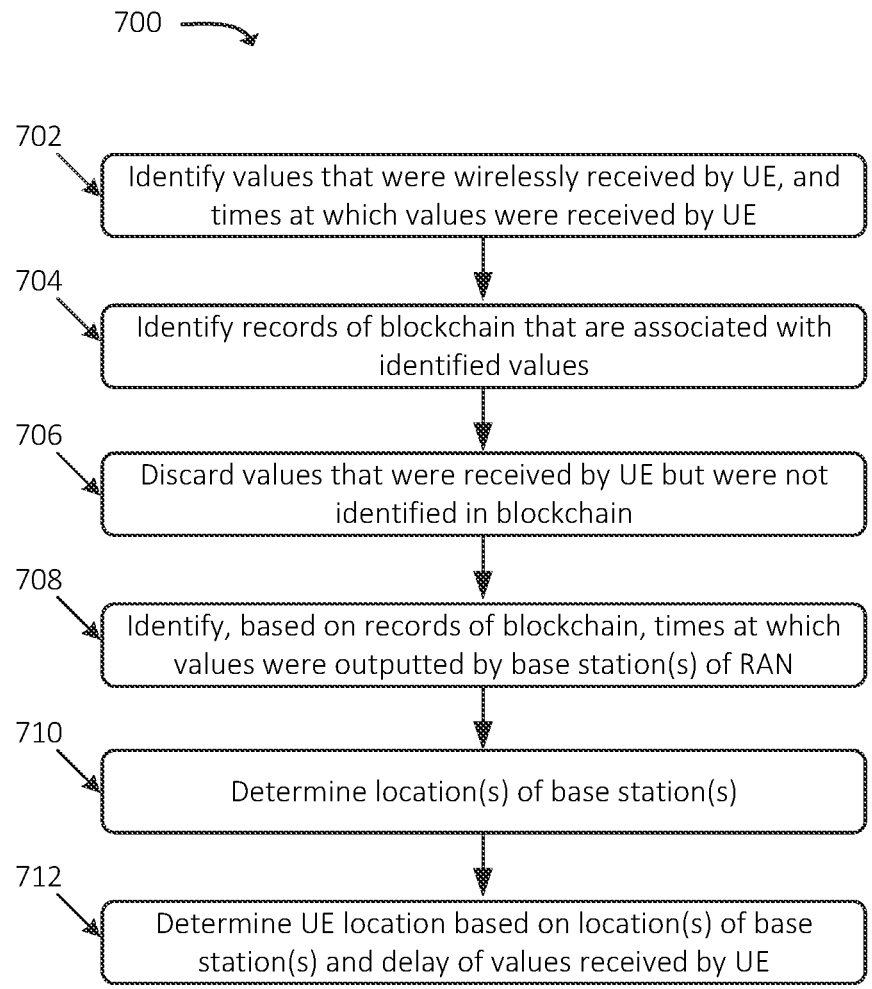
FIG. 7 illustrates an example process for securely determining a location of a UE based on messages outputted by one or more base stations as well as records recorded to a blockchain, in accordance with some embodiments.

FIG. 7 illustrates an example process 700 for securely determining a location of UE 201 based on messages outputted by one or more base stations 103 as well as records recorded to blockchain 101, in accordance with some embodiments. In some embodiments, some or all of process 700 may be performed by location validation system 403. In some embodiments, one or more other devices may perform some or all of process 700 in concert with, and/or in lieu of, location validation system 403, such as UE 201 and/or some other device or system.

As shown, process 700 may include identifying (at 702) values that were wirelessly received by UE 201, and times at which the values were received by UE 201. For example, as discussed above, location validation system 403 may receive a location validation request associated with UE 201, such as from UE 201, application server 401 that is communicatively coupled to UE 201, and/or some other source. Such request may include values wirelessly received by UE 201, such as random numbers Q received by UE 201 that were broadcasted or otherwise wirelessly outputted by one or more base stations 103. In some embodiments, such values may include a pre-defined pattern, a flag, indicator, etc. based on which UE 201 may identify that such values are random numbers Q that may be used in a manner described herein.

As discussed above, the times that UE 201 received the values may be different from times at which such values were outputted by the one or more base stations 103, which may indicate a propagation delay, travel time, etc. associated with the transmission of such values from base stations 103 to UE 201. As also discussed above, base stations 103 and/or clients 105 associated with base stations 103, may record information to blockchain 101 indicating the values (e.g., random numbers Q) and respective times at which such values were outputted by base stations 103. Base stations 103, clients 105, etc. (e.g., entities that record such records to blockchain 101) may be associated with a set of private keys, an address, etc. associated with blockchain 101, and blockchain 101 may authenticate, validated, etc. that source of the records before recording such records. As such, the presence of such records on blockchain 101 may indicate that the source of the records is legitimate inasmuch as such source is authorized to record information to blockchain 101.

Process 700 may further include identifying (at 704) records of blockchain 101 that are associated with the identified values. For example, as discussed above, such records may have been recorded to blockchain 101 by base stations 103, clients 105, and/or other sources, where such records may indicate times at which the values were outputted by respective base stations 103. Since the records are recorded to blockchain 101 by entities (e.g., base stations 103, clients 105, etc.) that are associated with authentication mechanisms enforced by blockchain 101 (e.g., where such entities are associated with a set of private keys, an address, etc. associated with blockchain 101), the identification (at 704) of records in blockchain 101 that match values wirelessly received by UE 201 may indicate that the values wirelessly received by UE 201 are authentic (e.g., not "spoofed").

Process 700 may accordingly include discarding (at 706) values that were wirelessly received by UE 201 but where not identified on blockchain 101. For example, such values may have been "spoofed" values or may otherwise be unrelated to or independent of the values (e.g., random numbers Q) discussed herein. The discarded values may accordingly be omitted from further operations discussed below.

Process 700 may also include identifying (at 708) times at which the identified values were outputted by base stations 103. For example, as discussed above, the records of blockchain 101 may further include times at which base stations 103 wirelessly outputted (e.g., broadcasted) the values. In some embodiments, the records of blockchain 101 may include base station identifiers of such base stations 103. In this manner, a particular base station 103 from which a particular value was outputted may be identified based on the records of blockchain 101. In some embodiments, the base station identifiers stored in blockchain 101 may be "private" identifiers, which are not wirelessly outputted (e.g., broadcasted) by base stations 103.

Process 700 may further include determining (at 710) locations of base stations 103. For example, location validation system 403 may determine geographical locations of base stations 103 based on a mapping of base station identifiers (e.g., private base station identifiers stored in blockchain 101) to respective locations of base stations 103. In some embodiments, the locations of base stations 103 may be stored in records of blockchain 101.

Process 700 may additionally include determining (at 712) the location of UE 201 based on the locations of base stations 103, and the delay of the values received by UE 201. As discussed above, the delay associated with a particular value may be based on a time at which the value was outputted by a given base station 103, and a time at which the value was received by UE 201. For example, the delay may be the difference of the time at which the value was received by UE 201 and the time at which the value was outputted by base station 103. In some embodiments, the location may be determined using triangulation techniques or other suitable techniques. In this manner, the location of UE 201 may be determined or monitored, may be securely validated as part of an authentication procedure (e.g., as discussed above with respect to FIG. 4), and/or may be used in another suitable manner. In some embodiments, a UE-determined location of UE 201 (e.g., as determined by UE 201 such as by using GPS techniques or other suitable techniques) may be verified or validated by way of process 700 (e.g., as discussed above). In this manner, the use of blockchain techniques as discussed herein may serve as an added layer of security in the determination or validation of the location of UE 201. As further discussed above, additional information may be securely recorded to blockchain 101, such as health metrics which may aid in the determination of whether a given UE 201 should connect to a given base station 103.

Figure 8:
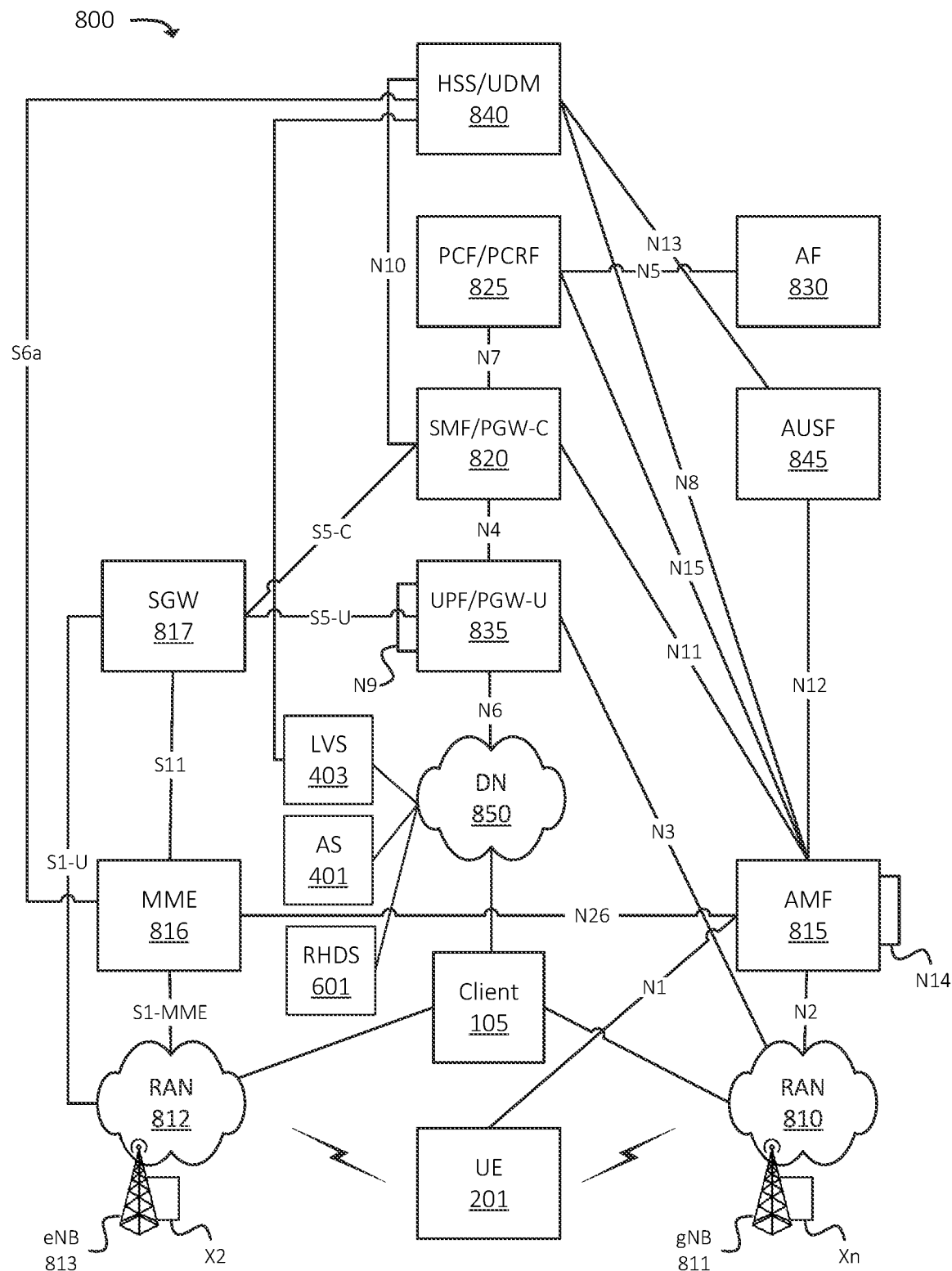
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 201, RAN 810 (which may include one or more Next Generation Node Bs ("gNBs") 811), RAN 812 (which may include one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as client 105, base station location repository 203, application server 401, location validation system 403, RAN health determination system 601, and/or one or more other devices or systems.

The example shown in FIG. 8 illustrates one instance of each network component or function (e.g., one instance of SMF/PGW-C 820, PCF/PCRF 825, UPF/PGW-U 835, HSS/UDM 840, and/or AUSF 845). In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or AUSF 845, while another slice may include a second instance of SMF/PGW-C 820, PCF/PCRF 825, UPF/PGW-U 835, HSS/UDM 840, and/or AUSF 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 201 may include a computation and communication device, such as a wireless mobile communication device that is capable of communicating with RAN 810, RAN 812, and/or DN 850. UE 201 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 201 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 201 may communicate with one or more other elements of environment 800. UE 201 may communicate with RAN 810 via an air interface (e.g., as provided by gNB 811). For instance, RAN 810 may receive traffic (e.g., voice call traffic, data traffic, messaging traffic, signaling traffic, etc.) from UE 201 via the air interface, and may communicate the traffic to UPF/PGW-U 835, and/or one or more other devices or networks. Similarly, RAN 810 may receive traffic intended for UE 201 (e.g., from UPF/PGW-U 835, AMF 815, and/or one or more other devices or networks) and may communicate the traffic to UE 201 via the air interface. In some embodiments, base station 103 may be, may include, and/or may be implemented by one or more gNBs 811.

RAN 812 may be, or may include, a LTE RAN that includes one or more base stations (e.g., one or more eNBs 813), via which UE 201 may communicate with one or more other elements of environment 800. UE 201 may communicate with RAN 812 via an air interface (e.g., as provided by eNB 813). For instance, RAN 810 may receive traffic (e.g., voice call traffic, data traffic, messaging traffic, signaling traffic, etc.) from UE 201 via the air interface, and may communicate the traffic to UPF/PGW-U 835, and/or one or more other devices or networks. Similarly, RAN 810 may receive traffic intended for UE 201 (e.g., from UPF/PGW-U 835, SGW 817, and/or one or more other devices or networks) and may communicate the traffic to UE 201 via the air interface. In some embodiments, base station 103 may be, may include, and/or may be implemented by one or more eNBs 813.

AMF 815 may include one or more devices, systems, Virtualized Network Functions ("VNFs"), Cloud-Native Network Functions ("CNFs"), etc., that perform operations to register UE 201 with the 5G network, to establish bearer channels associated with a session with UE 201, to hand off UE 201 from the 5G network to another network, to hand off UE 201 from the other network to the 5G network, manage mobility of UE 201 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, CNFs, etc., that perform operations to register UE 201 with the EPC, to establish bearer channels associated with a session with UE 201, to hand off UE 201 from the EPC to another network, to hand off UE 201 from another network to the EPC, manage mobility of UE 201 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 201. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 201, from DN 850, and may forward the user plane data toward UE 201 (e.g., via RAN 810, SMF/PGW-C 820, and/or one or more other devices). In some embodiments, multiple UPFs 835 may be deployed (e.g., in different geographical locations), and the delivery of content to UE 201 may be coordinated via the N9 interface (e.g., as denoted in FIG. 8 by the line marked "N9" originating and terminating at UPF/PGW-U 835). Similarly, UPF/PGW-U 835 may receive traffic from UE 201 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, CNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 201. As discussed above, in some embodiments, base station location repository 203 may be implemented by, may include, and/or may be communicatively coupled to HSS/UDM 840.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 201 may communicate, through DN 850, with data servers, other UEs 201, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 201 may communicate.

Figure 9:
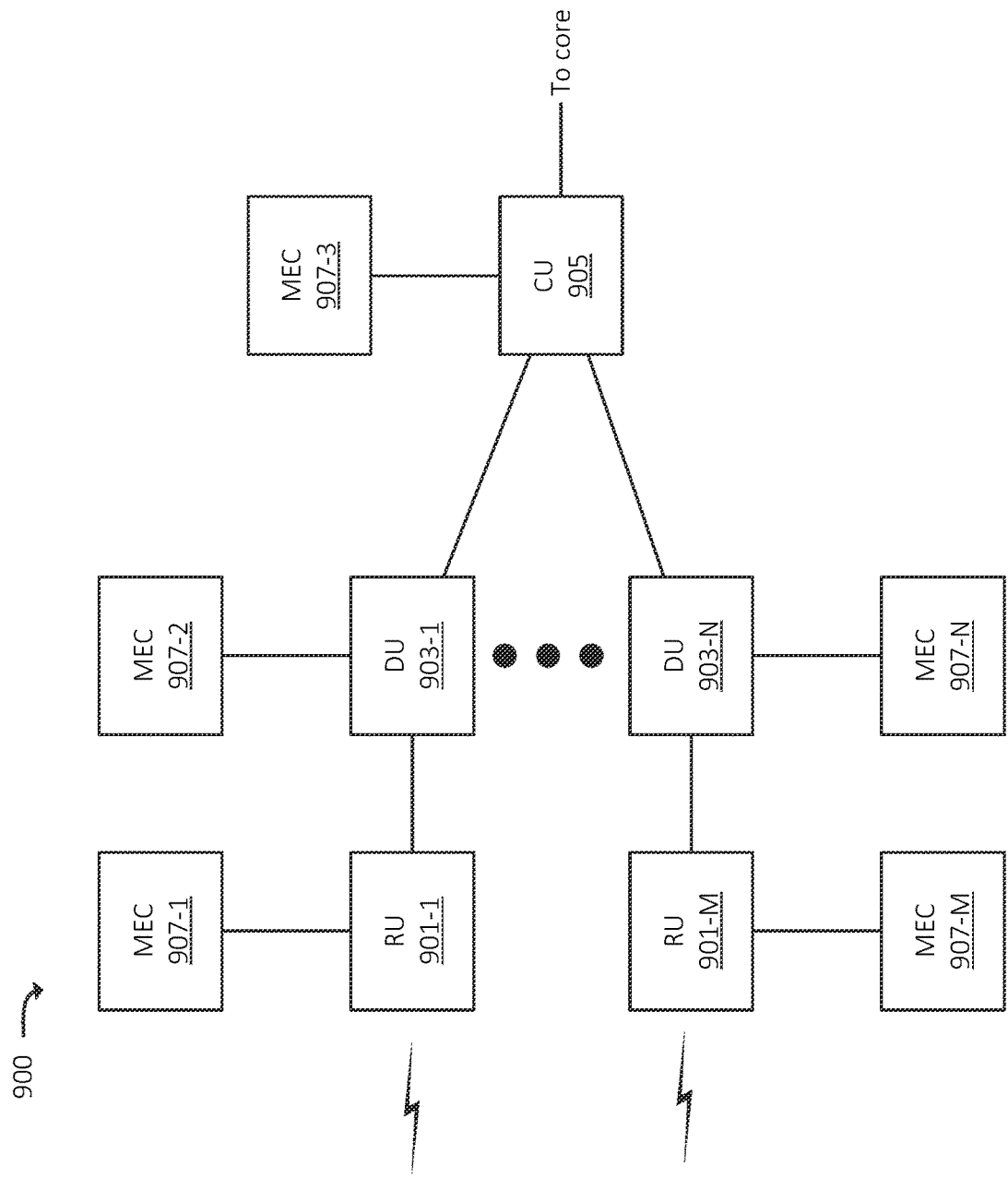
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 810, RAN 812, or some other RAN). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 201 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 201, and may determine which DU(s) 903 should receive the downlink traffic. DU 903 may include one or more devices that transmit traffic between a core network (e.g., via CU 905) and UE 201 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 201.

RU 901 may include hardware circuitry (e.g., one or more RF transceivers, antennas, radios, and/or other suitable hardware) to communicate wirelessly (e.g., via an RF interface) with one or more UEs 201, one or more other DUs 903 (e.g., via RUs 901 associated with DUs 903), and/or any other suitable type of device. In the uplink direction, RU 901 may receive traffic from UE 201 and/or another DU 903 via the RF interface and may provide the traffic to DU 903. In the downlink direction, RU 901 may receive traffic from DU 903, and may provide the traffic to UE 201 and/or another DU 903.

RUs 901 may, in some embodiments, be communicatively coupled to one or more Multi-Access/Mobile Edge Computing ("MEC") devices, referred to sometimes herein simply as "MECs" 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 201, via a respective RU 901.

For example, RU 901-1 may route some traffic, from UE 201, to MEC 907-1 instead of to a core network (e.g., via DU 903 and CU 905). MEC 907-1 may process the traffic, perform one or more computations based on the received traffic, and may provide traffic to UE 201 via RU 901-1. In this manner, ultra-low latency services may be provided to UE 201, as traffic does not need to traverse DU 903, CU 905, and an intervening backhaul network between DU network 900 and the core network. In some embodiments, MEC 907 may include, and/or may implement, some or all of the functionality described above with respect to client 105, application server 401, location validation system 403, RAN health determination system 601, UPF 835, and/or one or more other devices, systems, VNFs, CNFs, etc.

Figure 10:
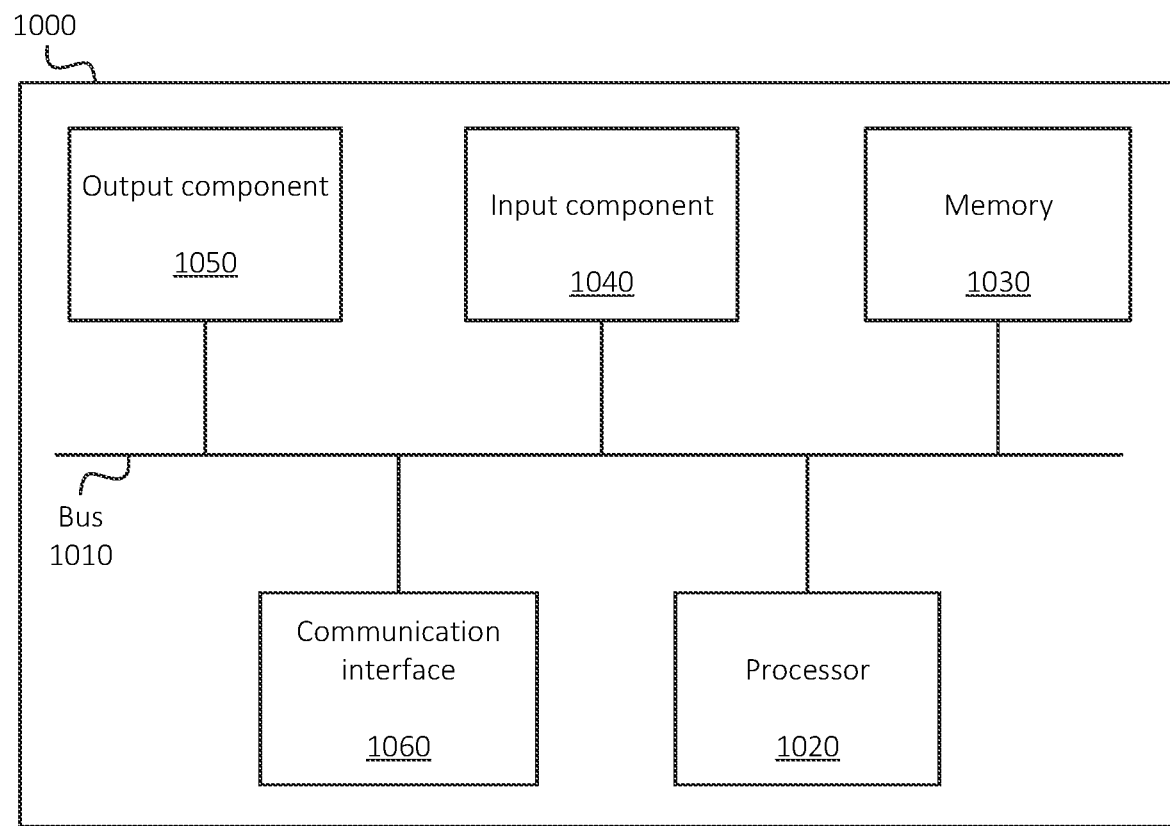
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth© radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
    one or more processors configured to:
        identify a first value that was wirelessly received by a User Equipment ("UE") at a first time;
        identify a first record, recorded to a blockchain, that includes the first value;
        identify, based on the first record, a particular base station of a wireless network that is associated with the first value;
        identify, based on the first record, a second time at which the first value was outputted by the particular base station, wherein the base station further outputs a second value at a third time;
        record, to the blockchain, a second record that includes information associating the second value with the third time;
        determine a location associated with the particular base station; and
        determine a location of the UE based on the location of the particular base station, the first time at which the first value was received by the UE, and the second time at which the first value was outputted by the particular base station.

2. The device of claim 1, wherein the first value includes a randomly generated number.

3. The device of claim 1, wherein the particular base station outputs the first value at the second time via one or more broadcast messages.

4. The device of claim 3, wherein the one or more broadcast messages include at least one of:
    a System Information Block ("SIB"), or
    a Master Information Block ("MIB").

5. The device of claim 1, wherein the particular base station is a first base station, wherein the one or more processors are further configured to:
    identify a third value that was wirelessly received by the UE at a fourth time; and
    identify a third record, recorded to the blockchain, that includes the third value and a fifth time at which a second base station wirelessly outputted the second value,
    wherein determining the location of the UE is further based on a location of the second base station, the fourth time at which the second value was received by the UE, and the fifth time at which the second value was outputted by the second base station.

6. The device of claim 1, wherein the one or more processors are further configured to:
    receive an indication of a UE-determined location of the UE; and validate or invalidate the UE-determined location based on determining the location of the UE based on the location of the particular base station, the first time at which the particular value was received by the UE, and the second time at which the particular value was outputted by the base station.

7. The device of claim 1, wherein a difference between the first time and the second time indicates a travel time associated with wireless signals between the base station and the UE.

8. A non-transitory computer-readable medium, storing a plurality of processor-executable instructions to:
identify a first value that was wirelessly received by a User Equipment ("UE") at a first time;
identify a first record, recorded to a blockchain, that includes the first value;
identify, based on the first record, a first base station of a wireless network that is associated with the first value;
identify, based on the first record, a second time at which the first value was outputted by the first base station;
determine a location associated with the first base station;
identify a second value that was wirelessly received by the UE at a third time;
identify a second record, recorded to the blockchain, that includes the second value and a fourth time at which a second base station wirelessly outputted the second value; and
determine a location of the UE based on:
the location of the first base station,
the first time at which the first value was received by the UE,
the second time at which the first value was outputted by the first base station,
a location of the second base station,
the third time at which the second value was received by the UE, and
the fourth time at which the second value was outputted by the second base station.

9. The non-transitory computer-readable medium of claim 8, wherein the first base station further outputs a third value at a fifth time, and wherein the plurality of processor-executable instructions further include processor-executable instructions to:
record, to the blockchain, a third record that includes information associating the third value with the fifth time.

10. The non-transitory computer-readable medium of claim 8, wherein the first value includes a randomly generated number.

11. The non-transitory computer-readable medium of claim 8, wherein the first base station outputs the first value at the second time via one or more broadcast messages.

12. The non-transitory computer-readable medium of claim 11, wherein the one or more broadcast messages include at least one of:
a System Information Block ("SIB"), or
a Master Information Block ("MIB").

13. The non-transitory computer-readable medium of claim 8, wherein the plurality of processor-executable instructions further include processor-executable instructions to:
receive an indication of a UE-determined location of the UE; and
validate or invalidate the UE-determined location based on determining the location of the UE based on the location of the first base station, the first time at which the particular value was received by the UE, and the second time at which the particular value was outputted by the base station.

14. The non-transitory computer-readable medium of claim 8, wherein a difference between the first time and the second time indicates a travel time associated with wireless signals between the base station and the UE.

15. A method, comprising:
identifying a particular value that was wirelessly received by a User Equipment ("UE") at a first time;
identifying a particular record, recorded to a blockchain, that includes the particular value;
identifying, based on the particular record, a particular base station of a wireless network that is associated with the particular value;
identifying, based on the particular record, a second time at which the particular value was outputted by the particular base station;
determining a location associated with the particular base station;
determining a location of the UE based on the location of the particular base station, the first time at which the particular value was received by the UE, and the second time at which the particular value was outputted by the base station;
receiving an indication of a UE-determined location of the UE; and
validating or invalidating the UE-determined location based on determining the location of the UE based on the location of the particular base station, the first time at which the particular value was received by the UE, and the second time at which the particular value was outputted by the base station.

16. The method of claim 15, wherein the particular value is a first value outputted by the particular base station at the second time, wherein the base station further outputs a second value at a third time, wherein the particular record is a first record, and the method further comprising:
recording, to the blockchain, a second record that includes information associating the second value with the third time.

17. The method of claim 15, wherein the particular base station outputs the particular value at the second time via one or more broadcast messages.

18. The method of claim 17, wherein the one or more broadcast messages include at least one of:
a System Information Block ("SIB"), or
a Master Information Block ("MIB").

19. The method of claim 15, wherein the particular value is a first value, wherein the particular record is a first record, and wherein the particular base station is a first base station, the method further comprising:
identifying a second value that was wirelessly received by the UE at a third time; and
identifying a second record, recorded to the blockchain, that includes the second value and a fourth time at which a second base station wirelessly outputted the second value,
wherein determining the location of the UE is further based on a location of the second base station, the third time at which the second value was received by the UE, and the fourth time at which the second value was outputted by the second base station.

20. The method of claim 15, wherein a difference between the first time and the second time indicates a travel time associated with wireless signals between the base station and the UE.

* * * * *